(12) United States Patent
Fukuda (10) Patent No.: US 8,176,348 B2
(45) Date of Patent: May 8, 2012

(54) CONTROL DEVICE AND INFORMATION PROCESSING APPARATUS

(75) Inventor: Michitaka Fukuda, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 650 days.

(21) Appl. No.: 12/360,957

(22) Filed: Jan. 28, 2009

(65) Prior Publication Data

US 2009/0204829 A1    Aug. 13, 2009

(30) Foreign Application Priority Data

Feb. 8, 2008  (JP) ................................ 2008-029492

(51) Int. Cl.
  *G06F 1/32* (2006.01)
  *G06F 1/00* (2006.01)
  *G06F 13/28* (2006.01)
(52) U.S. Cl. ........... 713/323; 713/320; 713/324; 710/22
(58) Field of Classification Search .................. 710/300, 710/310, 320, 323–324, 330, 340, 22; 709/217, 709/219; 713/300, 310, 320, 323–324, 330, 713/340
See application file for complete search history.

(56) References Cited

U.S. PATENT DOCUMENTS

| | | | | |
|---|---|---|---|---|
| 5,396,636 A * | 3/1995 | Gallagher et al. | ............ | 713/323 |
| 5,652,892 A * | 7/1997 | Ugajin | ............ | 713/310 |
| 6,041,382 A * | 3/2000 | Hirano | ............ | 710/316 |
| 6,101,608 A * | 8/2000 | Schmidt et al. | ............ | 726/2 |
| 6,760,850 B1 * | 7/2004 | Atkinson et al. | ............ | 713/320 |
| 2002/0134268 A1 * | 9/2002 | Yamada | ............ | 101/484 |
| 2002/0194512 A1 * | 12/2002 | Weng et al. | ............ | 713/300 |
| 2003/0028677 A1 * | 2/2003 | Fukuhara | ............ | 709/250 |
| 2005/0128515 A1 * | 6/2005 | Ohno | ............ | 358/1.15 |
| 2005/0216776 A1 * | 9/2005 | Watanabe | ............ | 713/300 |
| 2006/0265473 A1 * | 11/2006 | Muto | ............ | 709/218 |
| 2006/0282690 A1 * | 12/2006 | Cromer et al. | ............ | 713/300 |
| 2007/0079006 A1 * | 4/2007 | Oya | ............ | 709/245 |
| 2007/0247467 A1 * | 10/2007 | Kaneda | ............ | 345/531 |
| 2007/0279703 A1 | 12/2007 | Fukuda | | |
| 2008/0155286 A1 * | 6/2008 | Hirai | ............ | 713/320 |
| 2008/0170257 A1 | 7/2008 | Fukuda | | |
| 2008/0259408 A1 | 10/2008 | Fukuda | | |

FOREIGN PATENT DOCUMENTS

| | | |
|---|---|---|
| JP | 10-56526 | 2/1998 |
| JP | 2002-314727 | 10/2002 |
| JP | 2004-249687 | 9/2004 |
| JP | 2005-4289 | 1/2005 |
| JP | 3682971 | 6/2005 |
| JP | 2005-267097 | 9/2005 |
| JP | 3788451 | 4/2006 |
| JP | 2006-352914 | 12/2006 |

* cited by examiner

*Primary Examiner* — Thomas J Cleary (74) *Attorney, Agent, or Firm* — Oblon, Spivak, McClelland, Maier & Neustadt, L.L.P.

(57) ABSTRACT

A control device includes a main control unit that serves as a main component for device control and to which power is supplied from a first power unit; a power control unit that controls the first power unit and to which power is supplied from a second power unit; a memory control unit that accesses a memory that stores therein a computer program and data and to which power is supplied from the second power unit; and a network control unit that receives packets through a network and transfers the packets to the memory through the memory control unit and to which power is supplied from the second power unit.

16 Claims, 5 Drawing Sheets

BACKGROUND ART

FIG.6

CONTROL DEVICE AND INFORMATION PROCESSING APPARATUS

CROSS-REFERENCE TO RELATED APPLICATIONS

The present application claims priority to and incorporates by reference the entire contents of Japanese priority document 2008-029492 filed in Japan on Feb. 8, 2008.

BACKGROUND OF THE INVENTION

1. Field of the Invention

The present invention relates to a control device and an information processing apparatus.

2. Description of the Related Art

An information processing apparatus such as a multi function peripheral (MFP) has been proposed, for example, in Japanese Patent Application Laid-open No. 2005-267097, that is configured by connecting a main system that serves as a main component for an image process and a sub-system that controls power and a low level network process in a power saving mode.

Figure 6:
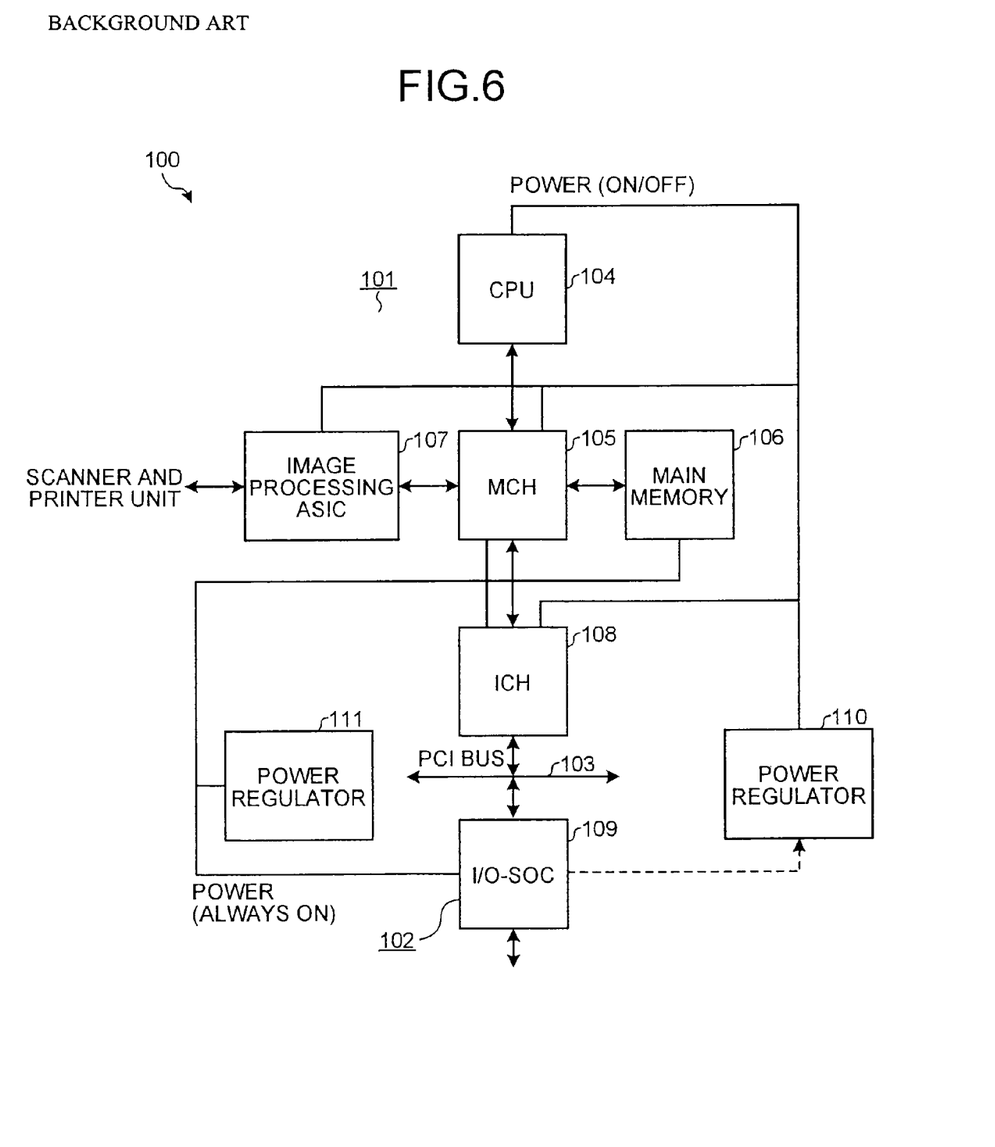
FIG. 6 is a block diagram of a configuration of a conventional information processing apparatus.

An example of the information processing apparatus that can be configured by connecting a main system and a sub-system with a bus is a processor adopting the configuration shown in FIG. 6. An information processing apparatus 100 shown in FIG. 6 is configured by connecting a main system 101 and a sub-system 102 with a peripheral component interconnect (PCI) bus 103.

The main system 101 includes a central processing unit (CPU) 104 that controls a process of the entire device, a memory controller hub (MCH) 105 that includes a memory controller, a main memory 106, an image processing application specific integrated circuit (image processing ASIC) 107, and an input/output (I/O) controller hub (ICH) 108 that includes an I/O controller. On the other hand, the sub-system 102 includes a system-on-a-chip (SOC) (hereinafter, "I/O-SOC") 109 that includes a network controller and a CPU that controls the network controller. The information processing apparatus 100 includes power regulators 110 and 111 for each component. The I/O-SOC 109 controls power of the information processing apparatus 100 and a low level network process when the information processing apparatus 100 is in a power saving mode.

The transition from a normal mode to the power saving mode of the information processing apparatus 100 is explained.

When the CPU 104 instructs the I/O-SOC 109 to shift to the power saving mode, the I/O-SOC 109 enters a network response able state.

When the CPU 104 instructs the MCH 105 to shift to a self-refresh mode, the main memory 106 shifts to the self-refresh state.

When the CPU 104 instructs the I/O-SOC 109 to partially turn off the power of the main system 101, the I/O-SOC 109 receives the instruction and instructs the power regulator 110 to turn off the power of target units. The power of the CPU 104, the MCH (excluding the memory controller) 105, the image processing ASIC 107, and the ICH (excluding the interface unit with the MCH 105) 108 are turned off. As a result, the mode shifts from the normal mode to the power saving mode.

Thereafter, the I/O-SOC 109 monitors the network packets and stands by for input of an apparatus return factor packet.

Next, the return from the power saving mode to the normal mode is explained.

The I/O-SOC 109 monitors the network packets. The I/O-SOC 109 itself operates a response process for a low level self hit packet (transmission control protocol/internet protocol (TCP/IP) layer 2 and below, for example, an address resolution protocol (ARP) and an internet control message protocol (ICMP)). A filter function in the I/O-SOC 109 rejects the packets that did not hit.

On the other hand, for a high level self hit packet (TCP/IP layer 3 and above, for example, a simple network management program (SNMP)), the I/O-SOC 109 determines that the I/O-SOC 109 itself cannot process the packet (an item that needs to be processed in the CPU 104 side) and boots up the main system 101. To boot up the main system 101, the I/O-SOC 109 instructs the power regulator 110 to turn on the power of the target units, and turns on the power of the CPU 104, the MCH 105, the image processing ASIC 107, the ICH 108, and the like.

When the power of the ICH 108 is turned on, the ICH 108 first releases a reset of the MCH 105. Then, the memory controller of the MCH 105 performs a self-refresh release process, and the main memory 106 returns to the normal state.

Next, the ICH 108 releases a reset of the CPU 104, and activates the CPU 104. Then, the CPU 104 starts fetching a program code from the main memory 106, and enters a network response able state.

After that, the CPU 104 notifies the I/O-SOC 109 that the CPU 104 was able to return from the power saving mode, and the I/O-SOC 109 stops the network response process. Thereafter, the CPU 104 performs the network response.

The information processing apparatus 100 that includes the main system 101 and the sub-system 102 can attempt to save power of the main system 101 without packet loss by performing the low level response process of the network on the sub-system 102 (the I/O-SOC 109) side with less electric power and sharing the network response process between the CPU 104 and the I/O-SOC 109 by switching a network processing position in the power saving mode and the normal system mode.

However, the following problems clearly exist.

(1) Network Performance (speed)
(2) Controller Option Performance (speed)
(3) Network Process Load of CPU (large load)
(4) Complication of Network Process Unit The problems are explained one by one.

The network performance (speed) (1) is easily affected by the performance of the parallel bus represented by the PCI bus. When the system is normal such as during network receiving, the data is transferred from a receive buffer of the I/O-SOC 109 to the main memory 106 via a direct memory access (DMA) transfer, and the CPU 104 performs a packet analysis process. When network sending, the data is transferred from the main memory 106 to a send buffer of the I/O-SOC 109 via the DMA transfer.

When the PCI bus 103 operates at 33 megahertzes and is 32 bits wide and effective efficiency thereof is 50%, the bandwidth becomes 528 megabits per second, and when the usage rate of receiving and sending is assumed to be 50%, each of the receiving and the sending is calculated to be able to use 264 megabits per second. This means that it completely becomes bus bottleneck and that the speed cannot be achieved when assuming a high speed internet represented by a gigabit Ethernet. Furthermore, the packet length actually varies, large or small, a good usage rate of the efficiency described above cannot be achieved, and a further reduction of the effective bandwidth is predicted.

For the controller option performance (speed) (2), the PCI bus is used for both the interface between the main system 101 and the sub-system 102 and the network interface of the I/O-SOC 109, so that the rate of acquiring a bus right decreases when the network process is high, i.e., when the usage rate of the PCI bus is high. Therefore, it may be difficult to exhibit a stable performance.

For the network process load of the CPU 104 (3), all packets are processed by the CPU 104 in normal system mode. However, the network process load of the CPU 104 is predicted to be high at this time because the CPU 104 reads all packets that are received in the CPU 104, and the CPU 104 determines unnecessary packets and necessary packets.

For the complication of the network process unit (4), the network process is shared between the CPU 104 and the I/O-SOC 109 by switching a network processing position in the power saving mode and the normal system mode. Therefore, a double mounting of components, an increase of procedures when switching the mode, and an increase of system cost can be predicted.

SUMMARY OF THE INVENTION

It is an object of the present invention to at least partially solve the problems in the conventional technology.

According to an aspect of the present invention, there is provided a control device including a main control unit that serves as a main component for device control and to which power is supplied from a first power unit; a power control unit that controls the first power unit and to which power is supplied from a second power unit independent from the first power unit; a memory control unit that accesses a memory that stores therein a computer program and data and to which power is supplied from the second power unit; and a network control unit that receives packets through a network and transfers the packets to the memory through the memory control unit and to which power is supplied from the second power unit.

According to another aspect of the present invention, there is provided an information processing apparatus including a first power unit; a second power unit that is provided independently from the first power unit; a memory that stores therein a computer program and data; and a control unit that manages the information processing apparatus and inputs and outputs the data through a network, wherein the control device includes a main control unit that serves as a main component for device control and to which power is supplied from the first power unit, a power control unit that controls the first power unit and to which power is supplied from the second power unit, a memory control unit that accesses the memory and to which power is supplied from the second power unit, and a network control unit that receives packets through the network and transfers the packets to the memory through the memory control unit and to which power is supplied from the second power unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

An embodiment of the present invention is explained based on FIGS. 1 to 5. The present embodiment is an example in which an SOC is applied as a control device 2 and a digital copier is applied as an information processing apparatus 1.

Figure 1:
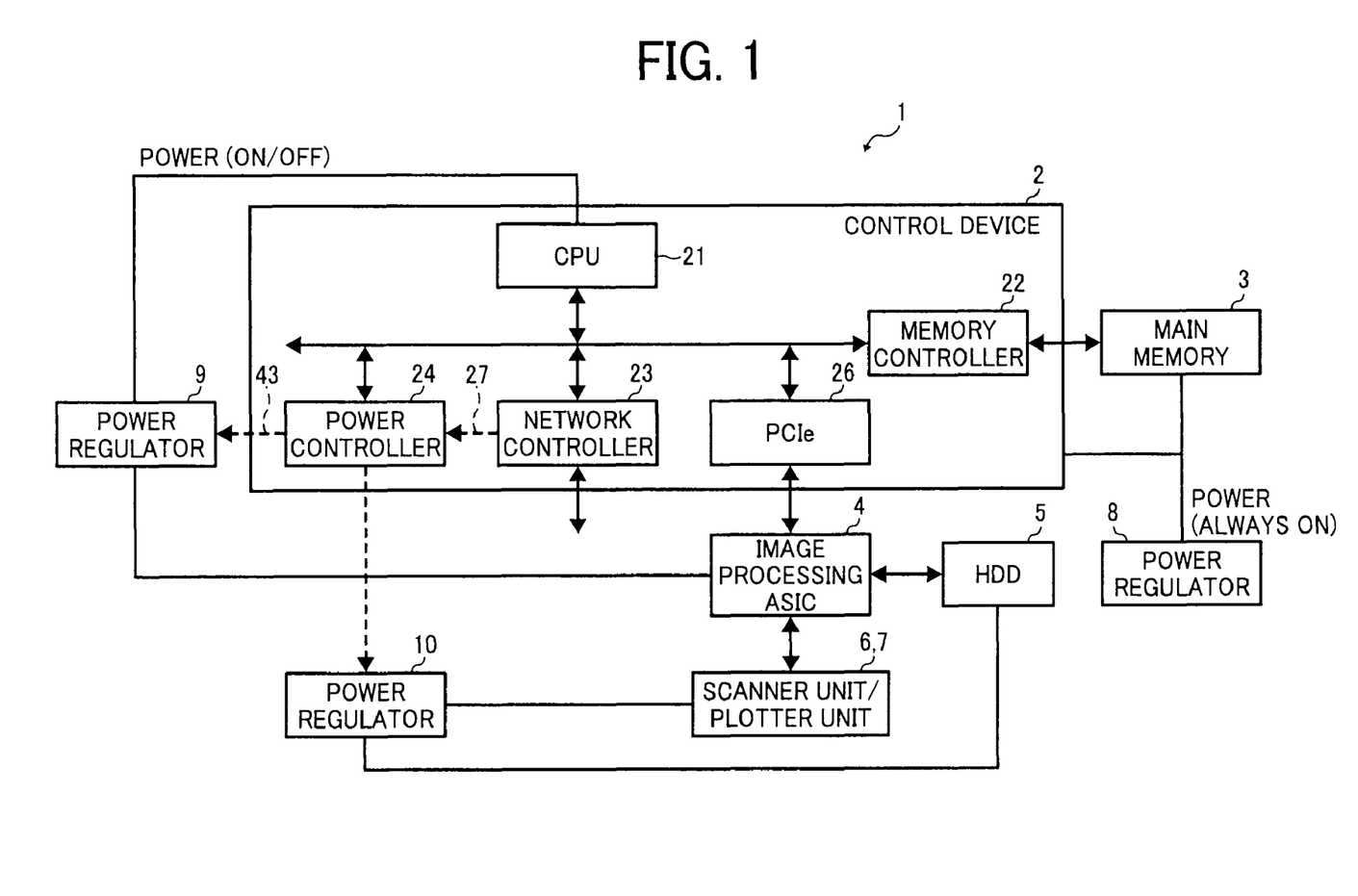
FIG. 1 is a block diagram of a configuration of an information processing apparatus according to an embodiment of the present invention.

FIG. 1 is a block diagram of a configuration of the information processing apparatus 1 according to the embodiment of the present invention. As shown in FIG. 1, the information processing apparatus 1 that is a digital copier includes the control device 2 that is the SOC managing the entire information processing apparatus 1, data-processing, and input and output print data, a main memory 3 that stores therein a computer program and data, an image processing ASIC 4 that processes images, a hard disk drive (HDD) 5 that stores therein data of the images processed by the image processing ASIC 4, a scanner unit 6, and a plotter unit 7.

As shown in FIG. 1, the control device 2 includes a CPU 21 that is the main control unit as the main component for device control, a memory controller 22 that is a memory control unit that accesses the main memory 3, a network controller 23 that is a network control unit that performs network communication, a power controller 24 that is a power control unit that controls power, and a system bus 25 that connects the CPU 21 and each functional block. Furthermore, the control device 2 includes a PCI express 26 that is an interface that connects the CPU 21 and the image processing ASIC 4.

The information processing apparatus 1 includes power regulators 8, 9, and 10 for each part. The power of the control device 2 includes at least two systems. One is a power system that is capable of being turned on or off by the power regulator 9 that is a first power unit. Another is a power system that is turned on all the time by the power regulator 8 that is a second power unit. The power system of the power regulator 9 that can be turned on and off is connected to the CPU 21 in the control device 2. Each unit other than the CPU 21 in the control device 2 is connected to the power system of the power regulator 8 that is turned on all the time. The power regulator 10 is a peripheral device power unit that supplies power to peripheral devices such as the HDD 5, the scanner unit 6, and the plotter unit 7.

Figure 2:
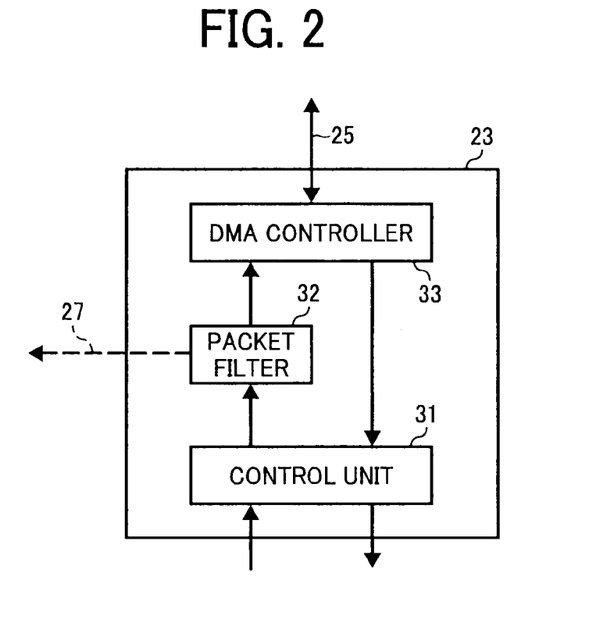
FIG. 2 is a block diagram of a configuration of a network controller shown in FIG. 1.

Next, the network controller 23 is explained referring to FIG. 2. As shown in FIG. 2, the network controller 23 includes a control unit 31 that controls the network communication and includes a sending and receiving buffer, a packet filter 32 that selects a network receiving packet, and a direct memory access (DMA) controller 33 that is connected to the system bus 25 in the control device 2. The packet filter 32 prepares a plurality of registers (such as an IP address setting register and a port number setting register). By comparing the values set in these registers and the content of the packet, the packet filter 32 can determine whether they are a hit. The packet filter 32 can be configured in hardware for example. When the packet is a hit in the packet filter 32, a packet hit notification signal 27 is notified to an outside module (the power controller 24) from the network controller 23.

Figure 3:
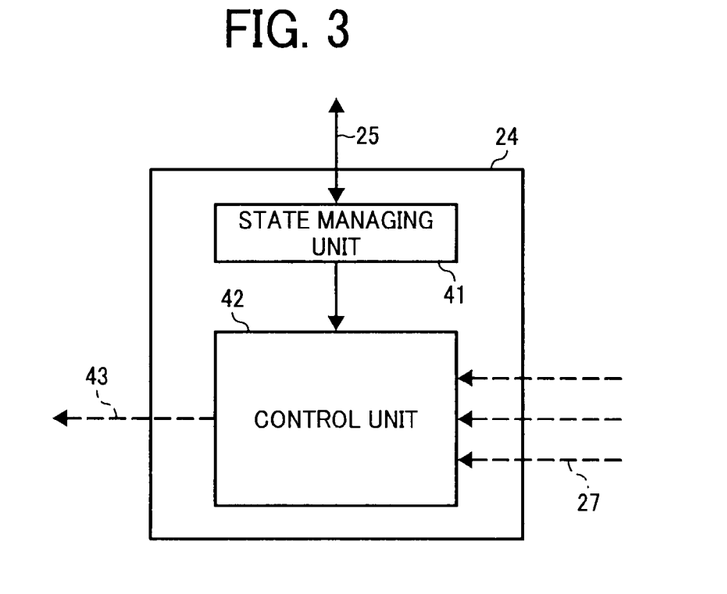
FIG. 3 is a block diagram of a configuration of a power controller shown in FIG. 1.

Next, the power controller 24 is explained referring to FIG. 3. As shown in FIG. 3, the power controller 24 includes a state managing unit 41 and a control unit 42. The state managing unit 41 has information whether the control device 2 is in a state of the power saving mode or a state of the normal mode. An input to the control unit 42 is the packet hit notification signal (system wake up signal) 27 notified to the outside module (the power controller 24) when the packet is a hit that is output from a functional block represented by the network controller 23. The control unit 42 outputs a power control signal 43 according to this input and the information in the state managing unit 41.

In the information processing apparatus 1, when a computer program in the main memory 3 starts, the CPU 21 executes various arithmetic processes and intensively controls each unit. Among the various arithmetic processes executed by the CPU 21 in the information processing apparatus 1, a mode transition process that is a featured process in the present embodiment is explained below.

Figure 4:
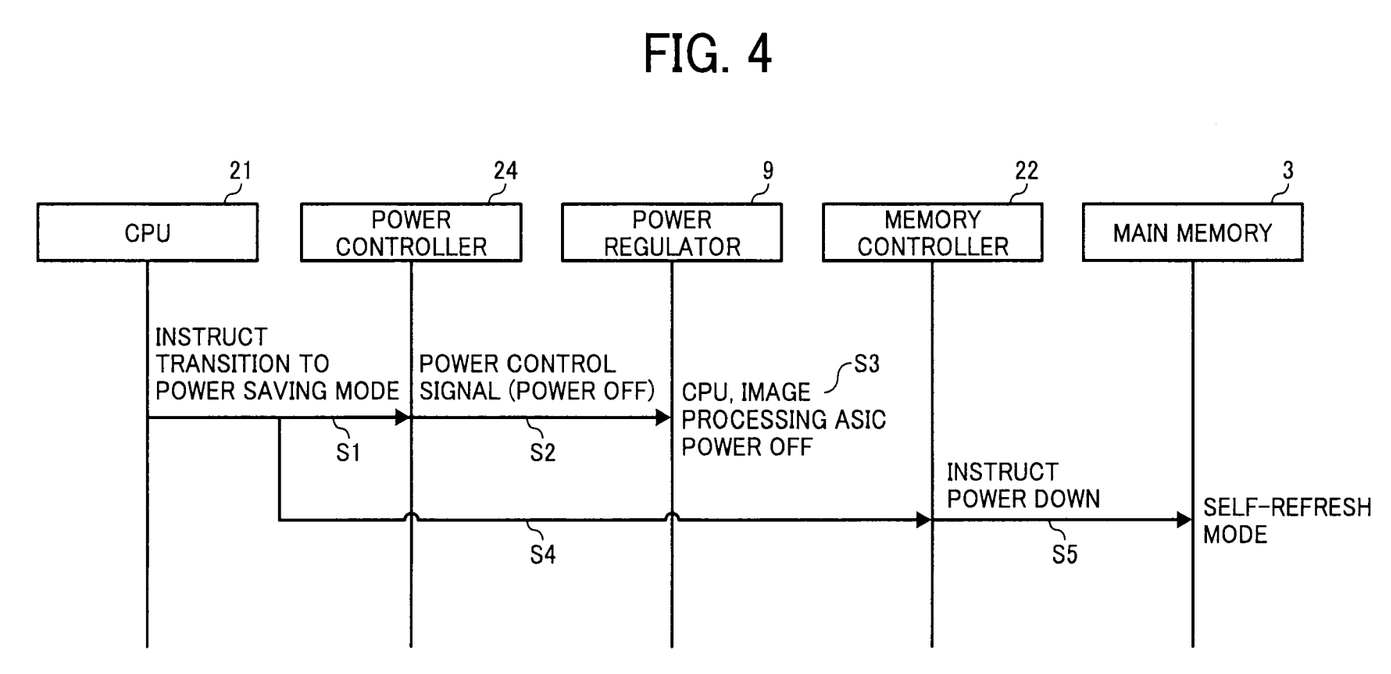
FIG. 4 is a sequence chart of a mode transition process from a normal mode to a power saving mode.

First, a mode transition process from the normal mode to the power saving mode is explained referring to the sequence chart in FIG. 4.

As shown in FIG. 4, when the CPU 21 instructs the power controller 24 to shift from the normal mode to the power saving mode (Step S1), the power controller 24 outputs the power control signal 43 to the power regulator 9 (Step S2), and the power regulator 9 turns the output power off based on the power control signal 43 (Step S3). In such way, the power of the CPU 21 and the image processing ASIC 4 are turned off.

On the other hand, when the CPU 21 instructs the memory controller 22 to shift from the normal mode to the power saving mode (Step S4), the memory controller 22 instructs the main memory 3 to power down to reduce power consumption of the main memory 3 (e.g., self-refresh mode) (Step S5).

Even when the mode transition is performed from the normal mode to the power saving mode in such way, the network controller 23 watches the network packet all the time because its power is turned on by the power regulator 8.

Before transition to the power saving mode, the CPU 21 sets packets that cause the CPU 21 to wake up to the packet filter 32 in the network controller 23. Moreover, the CPU 21 sets the DMA controller 33 to transfer the packet hits to arbitrary addresses in the main memory 3 before transition to the power saving mode.

Figure 5:
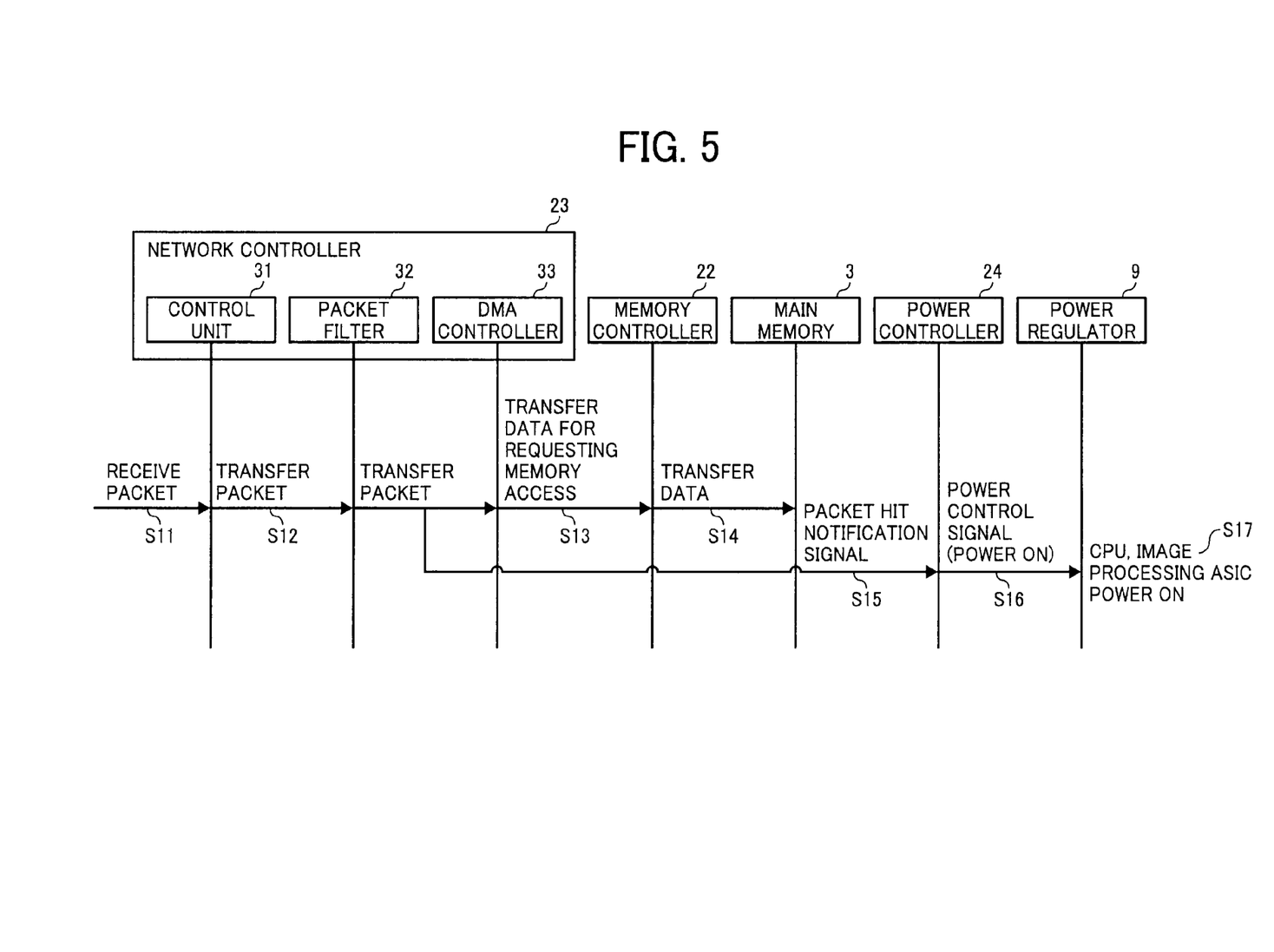
FIG. 5 is a sequence chart of a mode transition process from the power saving mode to the normal mode.

Next, a mode transition process from the power saving mode to the normal mode is explained referring to the sequence chart in FIG. 5.

For example, the CPU 21 sets the packet filter 32 to recognize a destination IP address 192.168.0.2 and port numbers 25 to 80 as a hit before transition to the power saving mode. The CPU 21 sets the DMA controller 33 to transfer the packet that was a hit to the main memory 3 through the DMA before transition to the power saving mode.

The CPU 21 sets the packet filter 32 to recognize the destination IP address 192.168.0.2 and the port numbers 25 to 80 as a hit before transition to the power saving mode in the present embodiment. However, this does not limit the present embodiment, and the CPU 21 can set all packets to be recognized as a hit for example.

As shown in FIG. 5, when the control unit 31 of the network controller 23 receives a packet of the destination IP address 192.168.0.2 and the port 80 (Step S11), the control unit 31 follows the rule set in the packet filter 32 (Step S12), and the corresponding packet flows into the DMA controller 33 (Step S13). The packet can be selected using the packet filter 32 in the network controller 23 at this time. Therefore, the time of maintaining the power saving mode can be kept as long as possible by rejecting unnecessary packets.

The DMA controller 33 transfers data to the main memory 3 through the memory controller 22 following the set rule (Step S14). The DMA controller 33 includes at least two or more channels for example, uses DMA channels depending on the type of the packet hits, and can transfer the packet hit to each arbitrary address in the main memory 3. For example, the following operations can be performed.

(1) The DMA controller 33 uses a first channel and transfers the packet to a 0x1000000 address of the main memory 3 when the packet is a hit with the set destination IP address and port number.

(2) The DMA controller 33 uses a second channel and transfers the packet to a 0x10004000 address of the main memory 3 when the packet is a hit with the set source IP address.

The memory controller 22 at this time can automatically return to the normal state from the power-down such as the self-refresh mode without intervention of the CPU 21 and can access the memory with a request for accessing memory as a trigger.

In addition, for example, when receiving the packet of the destination IP address 192.168.0.2 and the port 80 (Step S11), the control unit 31 of the network controller 23 notifies the power controller 24 of the packet hit notification signal 27 following the rule set in the packet filter 32 (Step S15).

When the control unit 31 notifies the power controller 24 of the packet hit notification signal 27, the control unit 42 determines that a system start is necessary based on the logic (the power saving mode at present) of the state managing unit 41 in the power controller 24 and the packet hit notification signal 27, and the power controller 24 notifies the power regulator 9 of a power control signal (ON request) 43 (Step S16).

When the power controller 24 notifies the power regulator 9 of the power control signal (ON request) 43, the power regulator 9 starts supplying power (Step S17), and turns the power of the CPU 21 and the image processing ASIC 4 that are connected to the power regulator 9 on. When the power is turned on, the CPU 21 obtains information of the state managing unit 41 of the power controller 24 before fetching code and starts reading (fetching code) from the main memory 3 when determining to return from the power saving mode to the normal mode.

After starting the system, the CPU 21 can set priorities for the packets classified by the DMA controller 33 and process the packets. Specifically, after starting the system, the CPU 21 processes the packets classified by the DMA controller 33 in an arbitrary order. When processing from the packet hit by the destination IP address and the port number for example, the packet process is performed by reading the data from the 0x10000000 address of the main memory 3. After that, the packet process is performed on the packet hit with the source IP address by reading the data from the 0x10004000 address of the main memory 3. With this, the system can return at a higher speed.

The CPU 21 interprets the packet data kept in the main memory 3, selects the system to be started up from its content, and can voluntarily perform the power control. Specifically, after starting the system, the CPU 21 starts the process by reading the packet data transferred to the main memory 3 by the DMA controller 33 in order. The CPU 21 outputs an instruction to the power controller 24 and appropriately turns the power of each unit on following the content of the packet. A specific example is as follows.

(1) The CPU 21 reads the data from the main memory 3 and interprets to send back only a part of the information of the data in the HDD 5 from the content of the packet.

(2) The CPU 21 instructs the power controller 24 to turn the image processing ASIC 4 and the HDD 5 on (keep the power of the scanner unit 6 and the plotter unit 7 off).

(3) The CPU 21 reads arbitrary data in the HDD 5.

(4) The CPU 21 sends back the read arbitrary data over the network.

With this, the power consumption can be suppressed by optimally controlling the power all the time without turning all power on unnecessarily when entering the power saving mode.

According to the present embodiment, the control device 2 transfers the packet received at the network controller 23 to the main memory 3 while the power of the CPU 21 is turned off during the power saving mode. Therefore, the control device 2 can capture the packets without losing packets until the system returns from the power saving mode (the power of the CPU 21 is turned on and the CPU 21 starts to fetch code).

Furthermore, in the control device 2, the memory controller 22 puts the main memory 3 into a self-refresh state while the power of the CPU 21 is turned off during the power saving mode. When the system returns from the power saving mode, the power controller 24 teaches the CPU 21 that the system is returning from the power saving mode. Therefore, the system can return from the power saving mode at a higher speed by the CPU 21 reading out the code from the main memory 3 without reading out ROM via a low speed local bus.

Because the information processing apparatus 1 in the present embodiment includes the network controller 23 in the control device 2, the information processing apparatus 1 can easily obtain a high network performance (speed) compared with the case of performing a network communication with the sub-system. Because the information processing apparatus 1 includes the network controller 23 in the control device 2, the interface between the controller option system and the present system does not share the interface with the network controller. Therefore, a high controller option performance (speed) can easily be obtained compared with the case of performing a network communication with the sub-system. Because the information processing apparatus 1 includes the network controller 23 in the control device 2, the network process can be unified in the control device 2 regardless of whether it is in the normal mode or the power saving mode. Therefore, improvement can be made in the areas of the double mounting of components, the complication of the procedure, and the like when switching the mode, and the increase of system cost.

The information processing apparatus 1 in the present embodiment gives the network controller 23 a packet filter configuration that makes the CPU 21 not process all received packets. Therefore, the information processing apparatus 1 can decrease the network processing load of the CPU 21.

The control device 2 in the present embodiment separates the power of the CPU 21 to attempt to save power, and turn off the power of the CPU 21 during the power saving mode. Therefore, the low power consumption state during the power saving mode can be maintained even when unifying the network process in the control device 2.

The computer program executed in the information processing apparatus 1 in the present embodiment is provided by incorporating it into the main memory 3 in advance. However, it is not limited to this. The computer program can be configured such that it is provided by recording it as an installable format file or executable format file in a computer-readable recording medium such as a compact disk with read only memory (CD-ROM), a flexible disk (FD), a compact disk with read (CD-R), and a digital versatile disk (DVD).

The computer program executed in the information processing apparatus 1 in the present embodiment can be configured to provide by storing the computer program on the computer connected to a network such as the Internet and downloading the computer program to the HDD via the network.

According to an aspect of the present invention, a high network performance (speed) can be obtained easily compared with performing a network communication in a sub-system. Furthermore, a high controller option performance (speed) can be obtained easily compared with performing a network communication in a sub-system because the interface of the controller option system and the present system does not share with the interface of a network control unit. Furthermore, the double mounting of components, the complication of the procedure and the like when switching the mode, and the increase of system cost can be improved.

According to another aspect of the present invention, a low power consuming state can be maintained during a power saving mode even when the network process is unified to the control device.

According to still another aspect of the present invention, the packets can be captured without losing packets in the power saving mode until return of the system (power of the main control unit is turned on and it starts fetching code). Furthermore, the network process load of the main control unit can be reduced.

According to still another aspect of the present invention, a low power consuming state can be maintained during a power saving mode even when the network process is unified to the control device.

According to still another aspect of the present invention, the main control unit can read out a code (packet) from the memory and make the return from the power saving mode with high speed without reading out ROM via a low speed local bus.

According to still another aspect of the present invention, high network performance (speed) can be easily obtained.

According to still another aspect of the present invention, the return from the power saving mode can be performed with higher speed.

According to still another aspect of the present invention, power consumption can be limited by optimum power control at all times without turning all power on unnecessarily when returning from the power saving mode.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A control device comprising:
   a main control unit that serves as a main component for device control and to which power is supplied from a first power unit;
   a power control unit that controls the first power unit and to which power is supplied from a second power unit independent from the first power unit;
   a memory control unit that accesses a memory that stores therein a computer program and data, the memory control unit being supplied with power from the second power unit; and a network control unit that receives packets through a network and performs packet filtering and to which power is supplied from the second power unit, wherein when the main control unit instructs the power control unit to shift from a normal mode to a power saving mode, the power control unit controls the first power unit to turn off power from the first power unit to the main control unit, the network control unit transfers the packet, which has been accepted by the packet filtering, by a direct memory access through the memory control unit to the memory to cause the memory to store the packet, and determines whether the accepted packet is of a predetermined type to send a signal indicative of reception of the packet of the predetermined type to the power control unit, during the power saving mode, and the power control unit, when the power control unit receives the signal indicative of reception of the packet of the predetermined type from the network control unit, controls the first power unit to turn on power from the first power unit to the main control unit to return the first power unit from the power saving mode to the normal mode, and then the main control unit reads the packet that has been transferred from the network control unit and stored in the memory during the power saving mode, and processes the read packet.

2. The control device according to claim 1, wherein when the main control unit instructs the memory control unit to shift from the normal mode to the power saving mode, the memory control unit inactivates the memory.

3. The control device according to claim 2, wherein the memory control unit cancels an inactive state of the memory without intervention of the main control unit with a request for accessing the memory from the network control unit during the power saving mode as a trigger.

4. The control device according to claim 3, wherein the network control unit includes a direct memory access controller that includes a plurality of channels, and uses one of the channels for each of a plurality of types of the packet according to a set rule when transferring the packet using the direct memory access during the power saving mode.

5. The control device according to claim 2, wherein the main control unit sets priorities for packets that have been transferred from the network control unit and stored in the memory during the power saving mode, and reads the packets, after returning from the power saving mode to the normal mode.

6. The control device according to claim 2, wherein the main control unit reads packets that have been transferred from the network control unit and stored in the memory during the power saving mode, selects a peripheral device that needs to be booted up based on a content of the packets, and turns a power of the peripheral device on by controlling a peripheral device power unit that supplies power to the peripheral device, after returning from the power saving mode to the normal mode.

7. The control device according to claim 1, wherein the main control unit sets priorities for packets that have been transferred from the network control unit and stored in the memory during the power saving mode, and reads the packets, after returning from the power saving mode to the normal mode.

8. The control device according to claim 1, wherein the main control unit reads packets that have been transferred from the network control unit and stored in the memory during the power saving mode, selects a peripheral device that needs to be booted up based on a content of the packets, and turns a power of the peripheral device on by controlling a peripheral device power unit that supplies power to the peripheral device, after returning from the power saving mode to the normal mode.

9. An information processing apparatus comprising:
a first power unit;
a second power unit that is provided independently from the first power unit;
a memory that stores therein a computer program and data; and
a control unit that manages the information processing apparatus and inputs and outputs the data through a network, wherein
the control unit includes
a main control unit that serves as a main component for device control and to which power is supplied from the first power unit,
a power control unit that controls the first power unit and to which power is supplied from the second power unit,
a memory control unit that accesses the memory and to which power is supplied from the second power unit, and
a network control unit that receives packets through the network and performs packet filtering and to which power is supplied from the second power unit, wherein when the main control unit instructs the power control unit to shift from a normal mode to a power saving mode, the power control unit controls the first power unit to turn off power from the first power unit to the main control unit, the network control unit transfers the packet, which has been accepted by the packet filtering, by a direct memory access through the memory control unit to the memory to cause the memory to store that packet, and determines whether the accepted packet is of a predetermined type to send a signal indicative of reception of the packet of the predetermined type to the power control unit, during the power saving mode, and the power control unit, when the power control unit receives the signal indicative of reception of the packet of the predetermined type from the network control unit, controls the first power unit to turn on power from the first power unit to the main control unit to return the first power unit from the power saving mode to the normal mode, and then the main control unit reads the packet that has been transferred from the network control unit and stored in the memory during the power saving mode, and processes the read packet.

10. The information processing apparatus according to claim 9, wherein when the main control unit instructs the memory control unit to shift from the normal mode to the power saving mode, the memory control unit inactivates the memory.

11. The information processing apparatus according to claim 10, wherein the memory control unit cancels an inactive state of the memory without intervention of the main control unit with a request for accessing the memory from the network control unit during the power saving mode as a trigger.

12. The information processing apparatus according to claim 11, wherein the network control unit includes a direct memory access controller that includes a plurality of channels, and uses one of the channels for each of a plurality of types of the packet according to a set rule when transferring the packet using the direct memory access during the power saving mode.

13. The information processing apparatus according to claim 10, wherein the main control unit sets priorities for packets that have been transferred from the network control unit and stored in the memory during the power saving mode, and reads the packets, after returning from the power saving mode to the normal mode.

14. The information processing apparatus according to claim 10, further comprising:
    a plurality of peripheral devices that are controlled by the main control unit; and
    a peripheral device power unit that supplies power to the peripheral devices, wherein
    the main control unit reads packets that have been transferred from the network control unit and stored in the memory during the power saving mode, selects a boot-target peripheral device from among the peripheral devices that needs to be booted up based on a content of the packets, and turns a power of the boot-target peripheral device on by controlling the peripheral device power unit, after returning from the power saving mode to the normal mode.

15. The information processing apparatus according to claim 9, wherein the main control unit sets priorities for packets that have been transferred from the network control unit and stored in the memory during the power saving mode, and reads the packets, after returning from the power saving mode to the normal mode.

16. The information processing apparatus according to claim 9, further comprising:
    a plurality of peripheral devices that are controlled by the main control unit; and
    a peripheral device power unit that supplies power to the peripheral devices, wherein
    the main control unit reads packets that have been transferred from the network control unit and stored in the memory during the power saving mode, selects a boot-target peripheral device from among the peripheral devices that needs to be booted up based on a content of the packets, and turns a power of the boot-target peripheral device on by controlling the peripheral device power unit, after returning from the power saving mode to the normal mode.

* * * * *